United States Patent [19]

Sabatino

[11] 3,845,542
[45] Nov. 5, 1974

[54] METHOD OF ATTACHING A ROPE HANDLE TO A THIN-WALLED BATTERY

[75] Inventor: Anthony Sabatino, St. Paul, Minn.

[73] Assignee: Gould Inc., Mendota Heights, Minn.

[22] Filed: Mar. 25, 1974

[21] Appl. No.: 454,260

Related U.S. Application Data

[63] Continuation-in-part of Ser. No. 295,299, Oct. 5, 1972, abandoned.

[52] U.S. Cl.................. 29/458, 29/530, 136/166, 136/181
[51] Int. Cl............................................. B29d 31/00
[58] Field of Search ....... 29/460, 461, 472.9, 527.1, 29/530, 458, DIG. 1; 136/166, 181; 206/2

[56] References Cited
UNITED STATES PATENTS

| 1,532,263 | 4/1925 | Reiser | 136/166 UX |
|---|---|---|---|
| 1,543,160 | 6/1925 | Hottel | 136/166 UX |
| 1,546,648 | 7/1925 | Glidden et al. | 136/166 X |
| 1,550,698 | 8/1925 | Hazelett | 136/166 UX |
| 3,092,520 | 6/1963 | Buskirk et al. | 206/2 X |
| 3,684,582 | 8/1972 | Roberts | 136/166 |
| 3,764,394 | 10/1973 | Phillips | 136/166 |
| 3,770,511 | 11/1973 | Winterbottom et al. | 136/166 X |

FOREIGN PATENTS OR APPLICATIONS

| 744,799 | 10/1966 | Canada | 136/181 |

Primary Examiner—C. W. Lanham
Assistant Examiner—D. C. Reiley, III
Attorney, Agent, or Firm—Wolfe, Hubbard, Leydig, Voit & Osann, Ltd.

[57] ABSTRACT

A rope handle is attached to what is otherwise a standard automotive type battery container by forming, on the inner side of one of the container walls, a rib defining a pocket which is filled with epoxy resin to define a solid block into which is secured the end of a rope handle. If the addition of a rope handle is not desired, the container presents a standard outer appearance.

4 Claims, 6 Drawing Figures

PATENTED NOV 5 1974 3,845,542
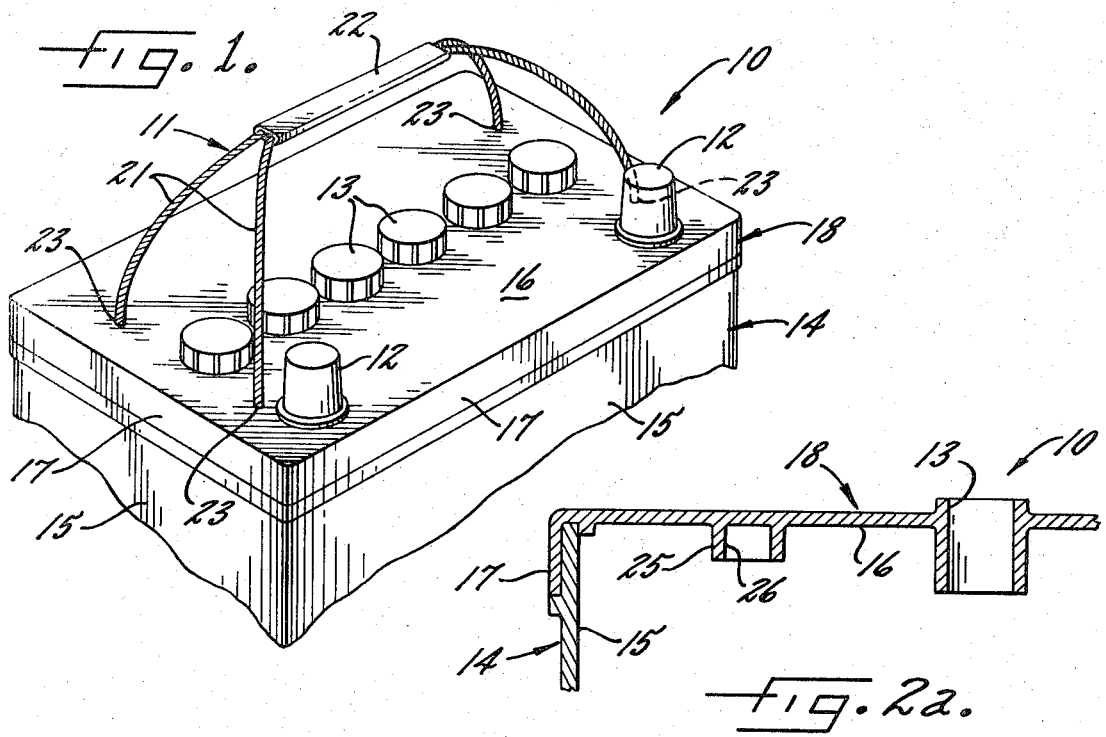
Fig. 1.
Fig. 2a.
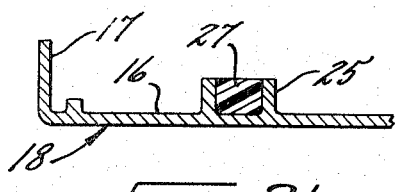
Fig. 2b.
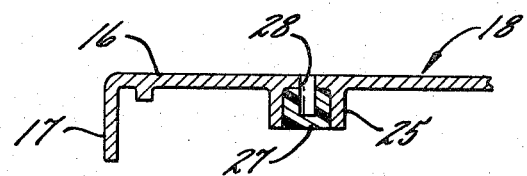
Fig. 2c.
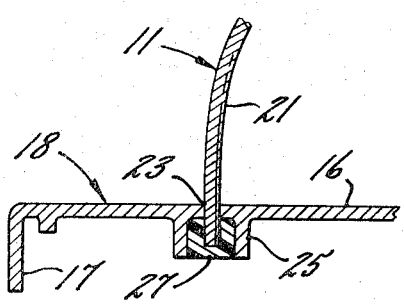
Fig. 2d.
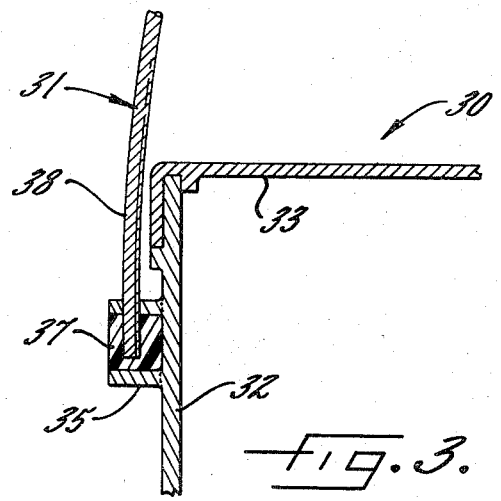
Fig. 3.

METHOD OF ATTACHING A ROPE HANDLE TO A THIN-WALLED BATTERY

This application is a continuation-in-part of application Ser. No. 295,299 filed Oct. 5, 1972, now abandoned.

This invention relates generally to the manufacture of electrical storage batteries and more particularly concerns making such batteries with carrying handles.

Over the years, the containers used for lead acid storage batteries have become increasingly thinner as new materials, such as various plastics, have been developed with properties suitable for making relatively thin-walled battery containers. When such batteries are intended for marine or certain industrial applications, it is common to provide rope handles for facilitating battery handling. A simple and convenient technique for providing such handles is shown in U.S. Pat. No. 3,092,520, issued June 4, 1963, wherein the ends of a plastic fibrous rope are cemented by epoxy resin into holes formed in the container. However, when the container is formed of relatively thin-walled sections, providing a solid anchoring point for the ends of the rope handle present a problem.

Accordingly, the primary aim of the invention is to provide a method to readily adapt an otherwise standard, relatively thin-walled battery container for the solid attachment of a rope handle.

It is also an object of the invention to provide a method as referred to above which is economical and well suited for high production manufacture.

Another object is to provide a method as characterized above that need cause no change in the appearance of the battery container in the event no handle is attached so that the same container can be used, for example, in the manufacture of automotive batteries.

Other objects and advantages of the invention will become apparent upon reading the following detailed description and upon reference to the drawings, in which:

FIG. 1 is a fragmentary perspective showing a battery having a rope handle attached in accordance with the invention;

FIGS. 2a–d are fragmentary sections showing successive steps in the attachment of one end of the handle appearing in FIG. 1; and FIG. 3 is a fragmentary section showing a second embodiment of the invention.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning to the drawings, there is shown in FIG. 1 a battery 10 having a handle 11 attached in accordance with the invention. The battery 10 is one of the standard automotive sizes and includes terminals 12, vents 13 and a container 14 made up of side walls 15 and a top wall 16. Preferably, the side walls 15 are molded integrally with a bottom wall, not shown, to define an open-topped box, and the top wall 16 is molded integrally with side flanges 17 to define a cover 18 sized to fit over and seal the open top of the container box. In keeping with modern practice, the container 14 is molded of a suitable plastic with wall thicknesses ranging from 0.07 to 0.12 of an inch.

The handle 11 is preferably formed of plastic fiber rope, polypropylene being suitable, and includes two rope lengths 21 jointly supporting a gripping sleeve 22 and solidly secured at four anchoring points 23.

In accordance with the invention, the handle 11 is attached to the container 14 by forming the wall 16, at each of the points 23, with a projecting rib 25 on the inner side of the wall so as to define a fluid containing picket 26, pouring settable plastic 27 into the picket so that, when the plastic 27 sets, the wall 16, the rib 25 and the plastic 27 define a solid block, and securing an end of the rope 21 in the block. In the embodiment of FIGS. 1 and 2, the plastic 27 is first set and then a hole or opening 28 is formed in the thin container wall 16 into which the end of the rope 21 is inserted and cemented in the plastic 27.

Of course the rope may be inserted while the settable plastic is still fluid in which case the plastic 27 serves as the cementing agent. Preferably, the settable plastic is an epoxy resin, and this material is also well suited to serve as the cementing agent securing the end of the rope 21 into the plastic 27 with the rope projecting out through the hole 28. As shown in the drawings, the opening 28 is of smaller cross-sectional area than the cross-sectional area of the pocket 26 in alignment therewith. Thus, even if the plastic 27 should separate or become unbonded from the inner walls of the pocket, the end of the rope is still secured in the opening 28 by the plastic. If desired, however, the pocket 26 may be treated before pouring in the resin by oxidizing the inner surfaces of the pocket with a flame or suitable chemical so as to obtain a better surface for epoxy adhesion.

In the illustrated embodiment under discussion, the rib 25 is annular and molded integrally with the wall 16 so that, in accordance with good molding technique, the thickness of the rib 25 is approximately the same as the thickness of the wall 16. The invention can also be carried out by making the rib 25 separately in the form of a ring or a cup and forming the wall and rib pocket 26 by securing the separate rib to the wall by heat, ultrasonic or solvent sealing. Each of the four anchoring points 23 are alike and, obviously, each step of the method can be conveniently performed at each of the four points virtually simultaneously.

Since the rib 25 is on the inside of the cover wall 16, if a handle is not installed the outer appearance of the cover will be smooth and unbroken so that the cover 18 is well suited for use on standard automotive batteries. Thus, the same cover design, utilizing only the small amount of plastic associated with the ribs 25, can be employed for both automotive and marine-type batteries.

In some applications, such as with heavier industrial batteries 30 (see FIG. 3), it is advantageous to secure handles such as a handle 31 to side walls 32 of the battery box rather than to a top cover wall 33. In that case, a rib 35 is formed, in this instance as a separate piece sealed on the outside of the container wall 32 to avoid interference with the contents of the container, the resulting pocket is filled with epoxy resin 37 into which the end of a rope 38 defining a portion of the handle 31 is secured. In this configuration, a hole is formed through the rib 35 which, if desired, can assume a square periphery. Also, the end of the rope 38 can be put into place within the pocket before that pocket is filled with the resin 37 so that the desired solid block is formed and the rope secured in the same step.

It will be apparent to those skilled in the art that the methods described abve can be performed quite economically and are well suited for high production battery manufacture.

I claim as my invention:

1. The method for attaching a rope handle to a battery having a relatively thin container wall comprising the steps of forming on only one side of said wall a thin projecting rib having substantially the same thickness as said wall so as to define a fluid containing pocket, pouring settable plastic into said pocket, causing said plastic to set so that the wall, rib and plastic define a solid block, then forming an opening through one of said thin container wall and thin projecting rib and extending into said plastic, said opening having a smaller cross sectional area than the cross sectional area of said pocket in alignment therewith, and securing the rope end of a handle in said solid block with said rope projecting out through said opening.

2. The method of claim 1 in which said pocket is formed on the inside of the completed battery container.

3. The method of claim 1 in which said wall is formed by molding, and said rib is molded integrally with the wall.

4. The method of claim 1 in which said wall and said rib are separately formed and including the step of attaching said rib to said wall.

* * * * *